United States Patent
Miyagi et al.

(10) Patent No.: US 8,526,899 B2
(45) Date of Patent: Sep. 3, 2013

(54) BROADCAST RECEIVING APPARATUS AND METHOD OF DETERMINING PRESENCE OF NOISE PERFORMED BY BROADCAST RECEIVING APPARATUS

(75) Inventors: Kohta Miyagi, Kobe (JP); Kazuo Takayama, Kobe (JP); Keita Taniguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 202 days.

(21) Appl. No.: 13/021,159

(22) Filed: Feb. 4, 2011

(65) Prior Publication Data

US 2011/0201290 A1    Aug. 18, 2011

(30) Foreign Application Priority Data

Feb. 15, 2010 (JP) ................................ 2010-030625
Jun. 16, 2010 (JP) ................................ 2010-137734

(51) Int. Cl.
*H04B 17/00* (2006.01)
*H04B 1/10* (2006.01)

(52) U.S. Cl.
USPC ...................... 455/226.1; 455/67.13; 455/222; 455/296

(58) Field of Classification Search
USPC .. 455/67.11, 67.7, 132, 135, 140, 222–226.4, 455/296, 305, 67.13
See application file for complete search history.

(56) References Cited

U.S. PATENT DOCUMENTS

| | | | |
|---|---|---|---|
| 3,978,412 A | 8/1976 | Frerking | |
| 4,356,567 A | 10/1982 | Eguchi et al. | |
| 4,379,207 A * | 4/1983 | Kubota | 455/205 |
| 4,388,496 A * | 6/1983 | Miyamoto | 381/2 |
| 4,435,618 A * | 3/1984 | Fujishima | 381/7 |
| 4,580,286 A * | 4/1986 | Richards, Jr. | 455/168.1 |
| 4,674,121 A * | 6/1987 | Miura et al. | 381/10 |
| 4,777,659 A * | 10/1988 | Lindenmeier et al. | 455/296 |
| 5,263,190 A * | 11/1993 | Taniguchi et al. | 455/297 |
| 5,630,217 A * | 5/1997 | Matsumoto | 455/222 |
| 6,690,805 B1 * | 2/2004 | Tsuji et al. | 381/94.1 |
| 6,771,942 B2 * | 8/2004 | Matsumoto | 455/131 |

(Continued)

FOREIGN PATENT DOCUMENTS

JP   A 63-087026   4/1988
JP   A 63-287223   11/1988

(Continued)

OTHER PUBLICATIONS

Notice of Allowance issued in U.S. Appl. No. 13/030,791 dated Mar. 20, 2013.

(Continued)

*Primary Examiner* — Simon Nguyen
(74) *Attorney, Agent, or Firm* — Oliff & Berridge, PLC

(57) ABSTRACT

To provide a broadcast receiving apparatus including an AM detector, an AM noise detector, an FM detector, an FM noise detector and a noise determining unit. The AM detector performs AM detection on an IF signal in airwaves received by a receiving antenna that receives incoming airwaves to acquire an AM detection signal. The AM noise detector detects noise components in the AM detection signal. The FM detector performs FM detection on the IF signal to acquire an FM detection signal. The FM noise detector detects noise components in the FM detection signal. The noise determining unit determines a noise status of a broadcast signal based on detection results acquired by the AM noise detector and the FM noise detector.

10 Claims, 14 Drawing Sheets

(56) References Cited

U.S. PATENT DOCUMENTS

| | | | |
|---|---|---|---|
| 7,668,525 B2 | 2/2010 | Shatara et al. | |
| 7,706,542 B2 * | 4/2010 | Suganuma | 381/13 |
| 7,805,120 B2 * | 9/2010 | Altizer | 455/223 |
| 2009/0286498 A1 * | 11/2009 | Katayanagi | 455/277.2 |
| 2011/0201290 A1 | 8/2011 | Miyagi et al. | |

FOREIGN PATENT DOCUMENTS

| | | |
|---|---|---|
| JP | A 1-232831 | 9/1989 |
| JP | A 8-274663 | 10/1996 |
| JP | A-09-214370 | 8/1997 |
| JP | A 2006-191430 | 7/2006 |
| JP | A-2009-005028 | 1/2009 |

OTHER PUBLICATIONS

Office Action issued Sep. 24, 2012 in related U.S. Appl. No. 13/030,791.

Related U.S. Appl. No. 13/030,791, filed Feb. 18, 2011 to Kohta Miyagi et al.

May 10, 2013 Chinese Office Action issued in Chinese Patent Application No. 2013050700883950 (with English-language Translation).

May 10, 2013 Chinese Office Action issued in Chinese Patent Application No. 201110038493.4 (with English-language Translation).

Mar. 27, 2013 Office Action issued in Chinese Application No. 201110048597.3 (with English Translation).

* cited by examiner

FIG.6

| NOISE COMPONENTS IN AM DETECTION SIGNAL | H | H | L | L |
|---|---|---|---|---|
| NOISE COMPONENTS IN FM DETECTION SIGNAL | H | L | H | L |
| NOISE DETERMINING UNIT 35 | NOISE COMPONENTS BOTH IN AM DETECTION SIGNAL AND FM DETECTION SIGNAL (LARGE NOISE) | NOISE COMPONENTS ONLY IN AM DETECTION SIGNAL (MEDIUM NOISE) | NOISE COMPONENTS ONLY IN FM DETECTION SIGNAL (MEDIUM NOISE) | NO NOISE COMPONENT (NO NOISE) |
| BLANKING PROCESSOR 14A (BLANKING PROCESSOR 17A) | FIRST BLANKING PROCESS (THIRD BLANKING PROCESS) | SECOND BLANKING PROCESS (FOURTH BLANKING PROCESS) | SECOND BLANKING PROCESS (FOURTH BLANKING PROCESS) | PROHIBIT BLANKING PROCESS |

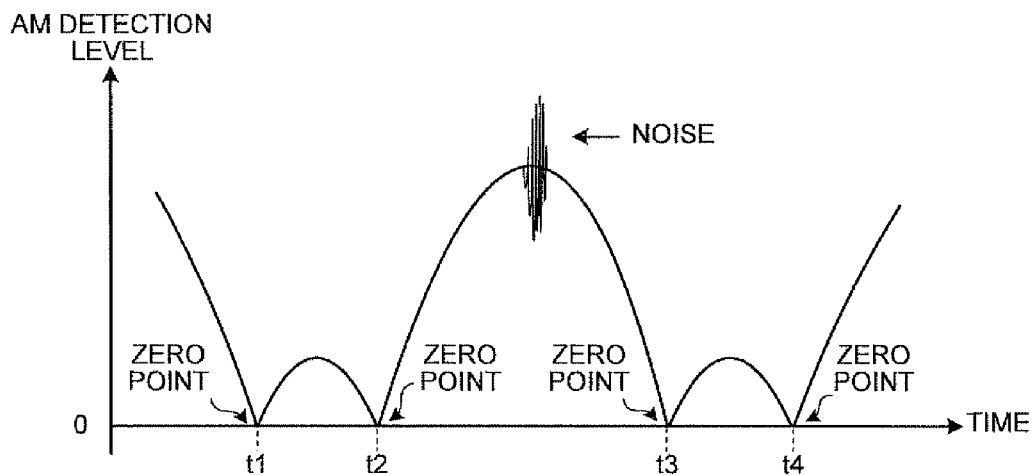
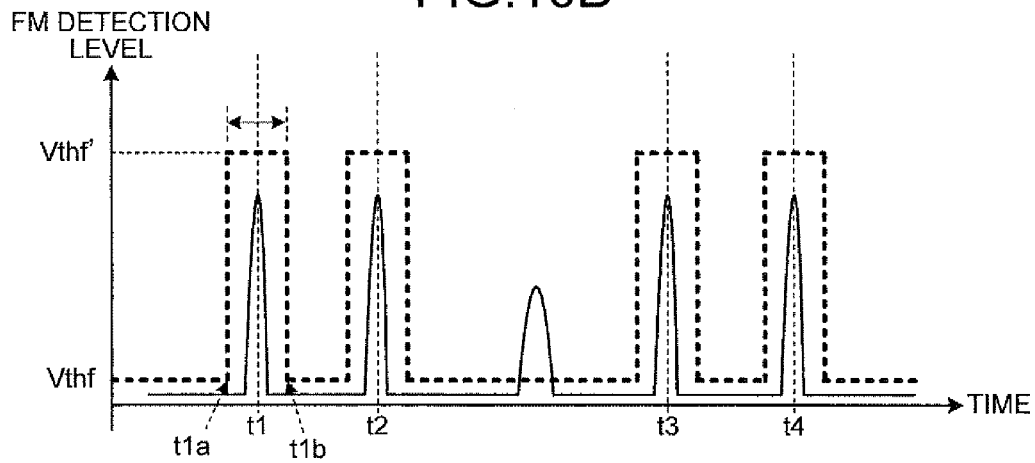
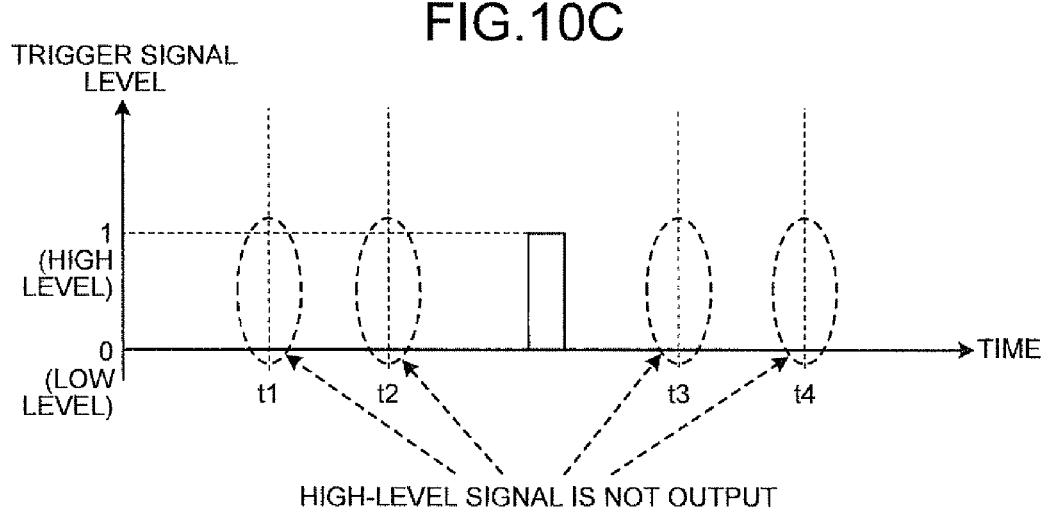

FIG.13

| NOISE COMPONENTS IN AM DETECTION SIGNAL | H | H | L | L |
|---|---|---|---|---|
| NOISE COMPONENTS IN FM DETECTION SIGNAL | H | L | H | L |
| NOISE DETERMINING UNIT 35 | NOISE COMPONENTS BOTH IN AM DETECTION SIGNAL AND FM DETECTION SIGNAL (LARGE NOISE) | NOISE COMPONENTS ONLY IN AM DETECTION SIGNAL (MEDIUM NOISE) | NOISE COMPONENTS ONLY IN FM DETECTION SIGNAL (MEDIUM NOISE) | NO NOISE COMPONENT (NO NOISE) |
| BLANKING PROCESSOR 14A (BLANKING PROCESSOR 17A) | FIRST BLANKING PROCESS (THIRD BLANKING PROCESS) | PROHIBIT BLANKING PROCESS | SECOND BLANKING PROCESS (FOURTH BLANKING PROCESS) | PROHIBIT BLANKING PROCESS |

BROADCAST RECEIVING APPARATUS AND METHOD OF DETERMINING PRESENCE OF NOISE PERFORMED BY BROADCAST RECEIVING APPARATUS

CROSS-REFERENCE TO RELATED APPLICATIONS

This application is based upon and claims the benefit of priority of the prior Japanese Patent Application No. 2010-030625, filed on Feb. 15, 2010 and Japanese Patent Application No 2010-137734, filed on Jun. 16, 2010, the entire contents of which are incorporated herein by reference.

BACKGROUND OF THE INVENTION

1. Field of the Invention

The present invention relates to a broadcast receiving apparatus that receives incoming airwaves such as radio broadcasting and television broadcasting, and a method of determining the presence of noise performed by a broadcast receiving apparatus.

2. Description of the Related Art

Conventionally, a broadcast receiving apparatus incorporated in a vehicle or the like receives incoming airwaves such as radio broadcasting and television broadcasting, and acoustically outputs a broadcast signal in the received airwaves from an in-vehicle speaker (see, for example, Japanese Patent Application Laid-open No H8-274663). Further, in a broadcast receiving apparatus, noise components are mixed in a received broadcast signal because a reception environment of airwaves changes with a movement of a vehicle having the broadcast receiving apparatus incorporated therein. Therefore, in conventional broadcast receiving apparatuses, to ensure the listenable or viewable level of broadcast signals for passengers, a function of removing noise components in the broadcast signal has been widely used.

For example, a broadcast receiving apparatus receives incoming airwaves, and performs AM detection on an intermediate frequency signal (hereinafter, simply "IF signal") of the broadcast signal in the received airwaves to acquire an AM detection signal. Next, the broadcast receiving apparatus detects AM noise components based on an AM detection level of the AM detection signal. Upon detection of the AM noise components, the broadcast receiving apparatus then determines the presence of noise in the broadcast signal based on the AM noise components. Subsequently, the broadcast receiving apparatus determines the presence of noise in the broadcast signal, and when there are any noise components, removes these noise components from the broadcast signal, and performs a blanking process for performing signal interpolation on 0a removed section, thereby removing noise components in the broadcast signal. This function has been widely known.

Further, there is another broadcast receiving apparatus that receives AM broadcast airwaves, performs FM detection on an AM broadcast signal in airwaves to acquire an FM detection signal, and extracts FM noise components from frequency fluctuation components in the FM detection signal. Further, there is also known a function of the broadcast receiving apparatus such that when a level of an extracted FM noise components is high, an output level of an AM broadcast signal is decreased, thereby alleviating an influence of noise components in the broadcast signal.

The conventional broadcast receiving apparatus presets a certain AM noise threshold Vtha, and determines whether the AM detection level of the AM detection signal is equal to or higher than the AM noise threshold Vtha. The broadcast receiving apparatus further detects a signal portion equal to or higher than the AM noise threshold Vtha of the AM detection level as an AM noise component. The broadcast receiving apparatus then determines the presence of noise in the broadcast signal corresponding to the AM detection signal, based on the AM noise component.

FIG. 14 is a schematic diagram for explaining an example of an AM detection level with respect to an IF signal. In the AM detection level shown in FIG. 14, for example, four types of noise statuses at a timing t1 to a timing t4 can be assumed. A timing t2 corresponds to a noise status where noise components are actually mixed and it is determined that the AM detection level is equal to or higher than the AM noise threshold Vtha. A timing t3 corresponds to a noise status where noise components are not actually mixed and it is determined that the AM detection level is lower than the AM noise threshold Vtha. The timing t1 corresponds to a noise status where although noise components are actually mixed, the noise component level is low, and it is determined that the AM detection level is lower than the AM noise threshold Vtha. The timing t4 corresponds to a noise status where although noise components are not actually mixed, it is determined that the AM detection level is equal to or higher than the AM noise threshold Vtha due to an influence of modulation components or the like in the AM detection signal.

However, in the conventional broadcast receiving apparatus, when the noise component level is low and it is determined that the AM detection level is lower than the AM noise threshold Vtha although noise components are actually mixed, the AM noise components cannot be detected, although there are noise components. As a result, in the conventional broadcast receiving apparatus, a broadcast signal is erroneously determined as a broadcast signal without noise, based on a detection result indicating that there is no AM noise component.

Further, in the conventional broadcast receiving apparatus, when it is determined that the AM detection level is equal to or higher than the AM noise threshold Vtha due to an influence of modulation components or the like although noise components are not actually mixed, modulation components equal to or higher than the AM noise threshold Vtha are erroneously detected as AM noise components. As a result, in the conventional broadcast receiving apparatus, a broadcast signal is erroneously determined as a broadcast signal with noise, based on the erroneously detected AM noise components.

SUMMARY OF THE INVENTION

It is an object of the present invention to at least partially solve the problems in the conventional technology.

A broadcast receiving apparatus according to the present invention includes a receiving unit that receives incoming airwaves, an AM detector that performs AM detection on a broadcast signal in airwaves received by the receiving unit to acquire an AM detection signal, an FM detector that performs FM detection on the broadcast signal to acquire an FM detection signal, and a noise determining unit that determines presence of noise in the broadcast signal based on the AM detection signal acquired by the AM detector and the FM detection signal acquired by the FM detector.

Further, a method of determining presence of noise performed by a broadcast receiving apparatus according to the present invention includes receiving incoming airwaves, performing AM detection on a broadcast signal in airwaves received at the receiving to acquire an AM detection signal, performing FM detection on the broadcast signal to acquire an FM detection signal, and determining presence of noise in the broadcast signal based on the AM detection signal acquired in the AM detection and the FM detection signal acquired in the FM detection.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table for explaining contents of noise determination and of a blanking process corresponding to a noise status of an AM detection signal and an FM detection signal in the first embodiment;

FIGS. 10A to 10C are operation examples of an over-modulation detector and a threshold changing unit;

FIG. 13 is a table for explaining contents of noise determination and of a blanking process corresponding to a noise status of an AM detection signal and an FM detection signal in another embodiment of the present invention.

DETAILED DESCRIPTIONS

Exemplary embodiments of a broadcast receiving apparatus and a method of determining the presence of noise performed by a broadcast receiving apparatus according to the present invention will be explained below in detail with reference to the accompanying drawings.

Figure 1:
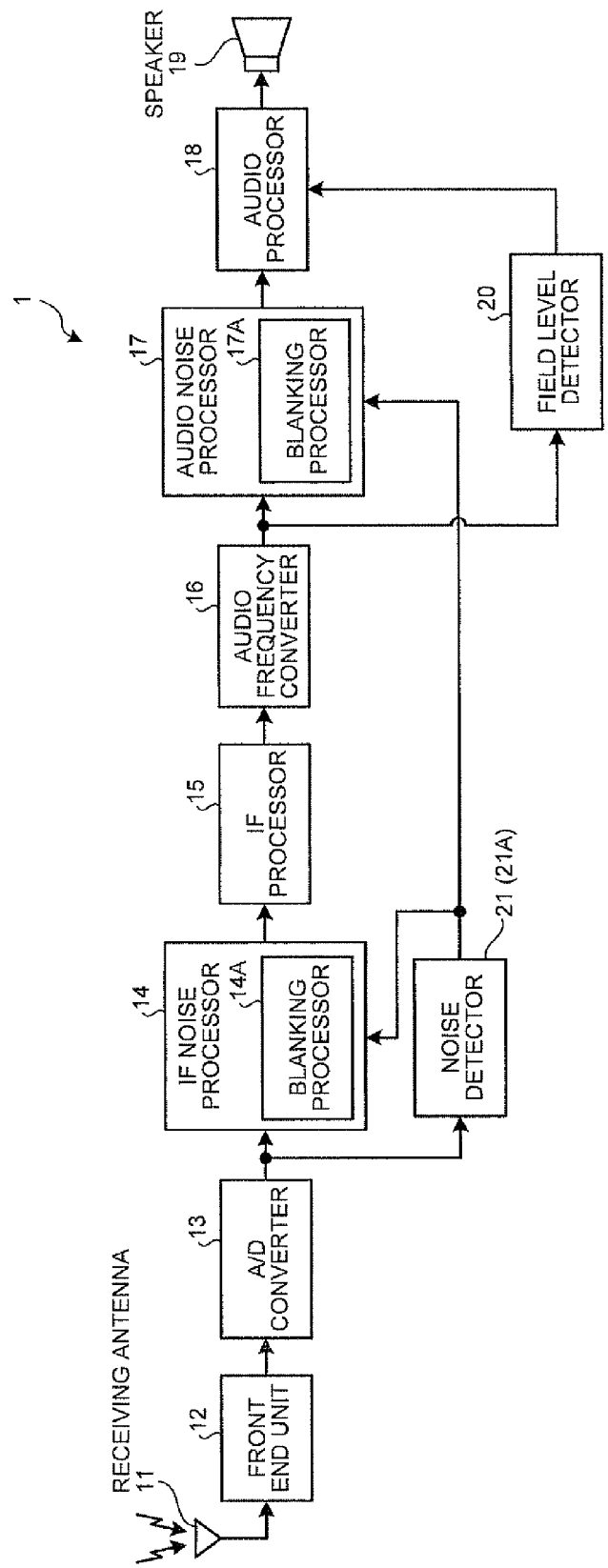
FIG. 1 is a block diagram of an internal configuration of a broadcast receiving apparatus according to a first embodiment of the present invention.

FIG. 1 is a block diagram of a schematic configuration of a broadcast receiving apparatus according to a first embodiment of the present invention. A broadcast receiving apparatus 1 shown in FIG. 1 corresponds to a receiving apparatus such as an AM broadcasting receiver or an FM broadcasting receiver that receives airwaves such as radio broadcasting or television broadcasting. The broadcast receiving apparatus 1 includes a receiving antenna 11, a front end unit 12, an A/D converter 13, an IF noise processor 14, and an IF processor 15. The broadcast receiving apparatus 1 further includes an audio frequency converter 16, an audio noise processor 17, an audio processor 18, a speaker 19, a field level detector 20, and a noise detector 21. Portions such as the A/D converter 13 and its subsequent elements up to the audio processor 18 are constituted of, for example, a digital signal processor (DSP); however, these are not limited to a DSP.

The receiving antenna 11 receives incoming airwaves such as radio broadcasting. The front end unit 12 converts airwaves received by the receiving antenna 11 to an intermediate frequency signal (hereinafter, simply "IF signal"). The A/D converter 13 converts the IF signal to a digital signal. The IF noise processor 14 performs a blanking process for removing noise components in the IF signal. The blanking process corresponds to, for example, interpolation for removing a section to be removed that includes noise components among continuous signal sections of the IF signal, and performing signal interpolation on the removed section. The IF processor 15 performs a digital filtering process on the IF signal having undergone a blanking process. The digital filtering process corresponds to a filtering process for removing an IF signal of a broadcasting frequency adjacent to a broadcasting frequency of the incoming airwaves as a disturbing signal.

The audio frequency converter 16 converts the IF signal having undergone a digital filtering process to an audio frequency signal (hereinafter, simply "audio signal"). The audio noise processor 17 performs a blanking process for removing noise components in the audio signal. The blanking process corresponds to interpolation for removing a section to be removed that includes noise components among continuous signal sections of the audio signal, and performing signal interpolation on the removed section.

The IF noise processor 14 performs a blanking process for removing noise components in the broadcast signal in an IF signal stage, whereas the audio noise processor 17 performs a blanking process for removing noise components in the broadcast signal in an audio signal stage in the subsequent stage. That is, the IF noise processor 14 and the audio noise processor 17 remove noise components in two stages, thereby reliably reducing noise components in the broadcast signal. Further, the audio processor 18 performs audio processing on the audio signal. The audio processing corresponds to audio mute processing or high cut processing for removing high-frequency components. The speaker 19 acoustically outputs an audio signal having undergone audio processing.

The field level detector 20 detects a received field strength level of the IF signal, and inputs the received field strength level to the audio processor 18. When the received field strength level is equal to or higher than a predetermined level, the audio processor 18 determines that the currently received field strength is good, and performs audio processing corresponding to an excellent received field strength level. When the received field strength level is lower than the predetermined level, the audio processor 18 determines that the currently received field strength is poor, and performs audio processing such as audio mute processing or high cut processing corresponding to a poor received field strength level.

Figure 2:
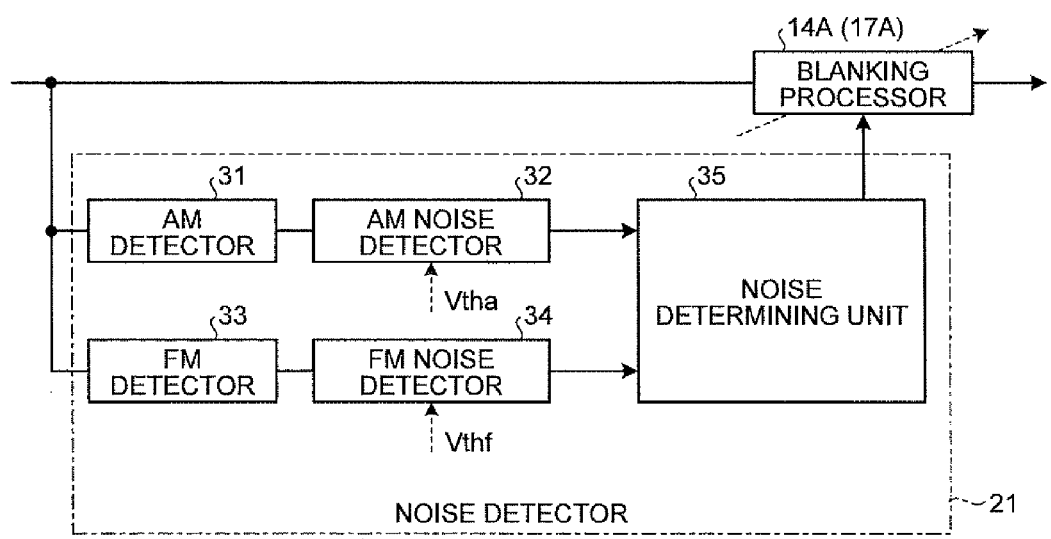
FIG. 2 is a block diagram of an internal configuration of a noise detector according to the first embodiment.

The noise detector 21 detects noise components in the AM detection signal and the FM detection signal from portions of IF signals sequentially detected via the A/D converter 13 at the same timing. FIG. 2 is a block diagram of an internal configuration of the noise detector 21. FIGS. 3A to 3E are schematic diagrams for explaining respective output signals in the noise detector 21 based on an analog point of view. For convenience of explanation, respective output signals in the noise detector 21 are explained by using an analog waveform. However, needless to say, these are processed digitally in practice.

Figure 3A:
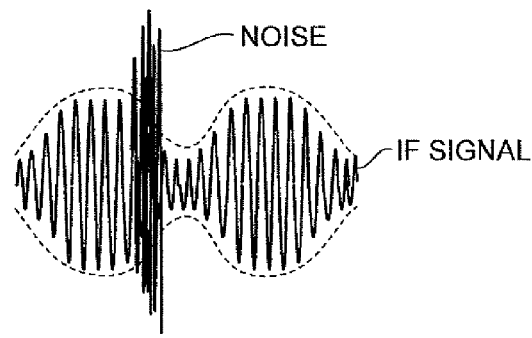
FIGS. 3A to 3E are schematic diagrams for illustrating respective output signals in the noise detector based on an analog point of view.
Figure 3B:
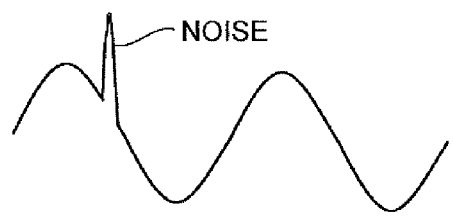
Figure 3C:
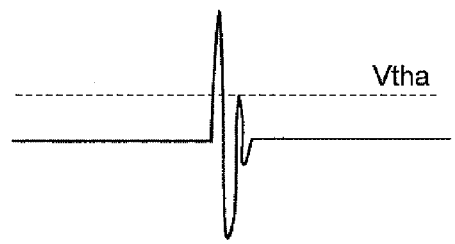

The noise detector 21 shown in FIG. 2 includes an AM detector 31, an AM noise detector 32, an FM detector 33, an FM noise detector 34, and a noise determining unit 35. The AM detector 31 performs AM detection on the IF signal shown in FIG. 3A, to acquire an AM detection signal as shown in FIG. 3B. The AM noise detector 32 determines whether an AM detection level of the AM detection signal is equal to or higher than a certain AM noise threshold Vtha, as shown in FIG. 3C. The AM noise detector 32 detects a signal portion equal to or higher than the AM noise threshold Vtha of the AM detection level as an AM noise component in the AM detection signal. When having detected the AM noise component, the AM noise detector 32 outputs a high-level signal to the noise determining unit 35, or when the AM noise detector 32 has not detected the AM noise component, the AM noise detector 32 outputs a low-level signal to the noise determining unit 35.

Figure 3D:
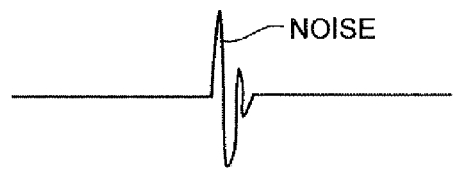
Figure 3E:
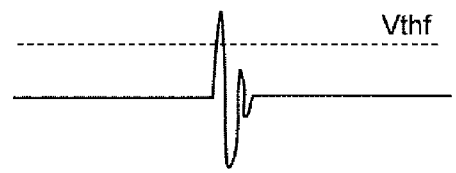

The FM detector 33 performs FM detection on the IF signal, to acquire an FM detection signal as shown in FIG. 3D. The FM noise detector 34 determines whether an FM detection level of the FM detection signal is equal to or higher than a certain FM noise threshold Vthf, as shown in FIG. 3E. The FM noise detector 34 detects a signal portion equal to or higher than the FM noise threshold Vthf of the FM detection level as an FM noise component in the FM detection signal. The FM noise component is generated due to a phase disturbance occurring at the time of noise contamination, regardless of level variation of the AM noise component. Therefore, when the FM noise component is used, for example, the presence of noise components, which cannot be detected by the AM noise detector 32, such as noise components at the timing t1 and the timing t2 in FIG. 4 described later, can be determined. Further, when having detected the FM noise component, the FM noise detector 34 outputs a high-level signal to the noise determining unit 35, or when the FM noise detector 34 has not detected any FM noise component, the FM noise detector 34 outputs a low-level signal to the noise determining unit 35.

The AM noise detector 32 sequentially determines the AM detection level of the AM detection signal with the AM noise threshold Vtha, and the FM noise detector 34 sequentially determines the FM detection level of the FM detection signal with the FM noise threshold Vthf. At this time, the AM noise detector 32 and the FM noise detector 34 simultaneously output noise detection results of the AM detection level and the FM detection level of the IF signal obtained at the same timing.

Figure 4:
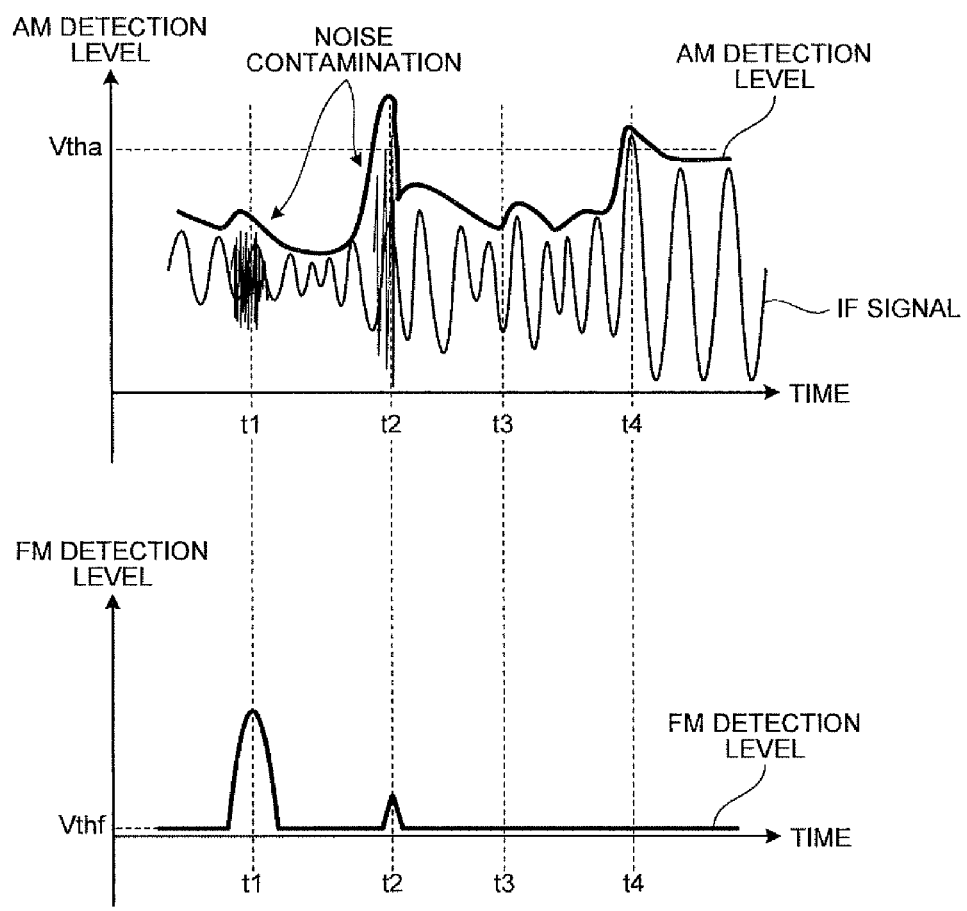
FIG. 4 is a schematic diagram for explaining the presence of noise components in an AM detection level and an FM detection level with respect to an IF signal.

The noise determining unit 35 determines the noise status of the broadcast signal based on the output signals (detection results) of the AM noise detector 32 and the FM noise detector 34. FIG. 4 is a schematic diagram for explaining the presence of noise components in the AM detection level and the FM detection level with respect to the IF signal.

Four types of noise statuses at the timing t1 to the timing t4, as shown in FIG. 4, can be assumed for the AM detection level. The timing t2 corresponds to a noise status where noise components are actually mixed and the AM detection level is equal to or higher than the AM noise threshold Vtha. The timing t3 corresponds to a noise status where noise components are not actually mixed and the AM detection level is lower than the AM noise threshold Vtha. The timing t1 corresponds to a noise status where although noise components are actually mixed, the noise component level is low, and the AM detection level is lower than the AM noise threshold Vtha. The timing t4 corresponds to a noise status where although noise components are not actually mixed, and the AM detection level is equal to or higher than the AM noise threshold Vtha due to an influence of modulation components or the like in the AM detection signal.

Upon simultaneous detection of high-level signals from the AM noise detector 32 and the FM noise detector 34, the noise determining unit 35 determines that noise components are mixed in both the AM detection signal and the FM detection signal, for example, as shown at the timing t2. Further, upon determination of the presence of noise components in both the AM detection signal and the FM detection signal, the noise determining unit 35 determines that there is noise in the broadcast signal equal to or higher than a reference level, that is, large noise. The noise determining unit 35 then outputs a control signal indicating a determination that the broadcast signal includes large noise to the IF noise processor 14 and the audio noise processor 17.

Further, upon simultaneous detection of a low-level signal from the AM noise detector 32 and a high-level signal from the FM noise detector 34, the noise determining unit 35 determines that the FM detection signal includes FM noise components, for example, as shown at the timing t1. Further, upon determination of the presence of FM noise components, the noise determining unit 35 determines that there is noise in the broadcast signal lower than the reference level, that is, medium noise. The noise determining unit 35 then outputs a control signal indicating a determination that the broadcast signal includes medium noise to the IF noise processor 14 and the audio noise processor 17.

Upon simultaneous detection of a high-level signal from the AM noise detector 32 and a low-level signal from the FM noise detector 34, the noise determining unit 35 determines that the AM detection signal includes AM noise components, for example, as shown at the timing t4. Further, upon determination of the presence of AM noise components, the noise determining unit 35 determines that there is noise in the broadcast signal lower than the reference level, that is, medium noise. The noise determining unit 35 then outputs a control signal indicating a determination that the broadcast signal includes medium noise to the IF noise processor 14 and the audio noise processor 17.

Upon simultaneous detection of low-level signals of the AM noise detector 32 and the FM noise detector 34, the noise determining unit 35 determines that both the AM detection signal and the FM detection signal do not include noise components, for example, as shown at the timing t3. Further, upon determination that both the AM detection signal and the FM detection signal do not include noise components, the noise determining unit 35 determines that the broadcast signal does not include noise. The noise determining unit 35 then outputs a control signal indicating a determination that the broadcast signal does not include noise to the IF noise processor 14 and the audio noise processor 17.

Figure 5A:
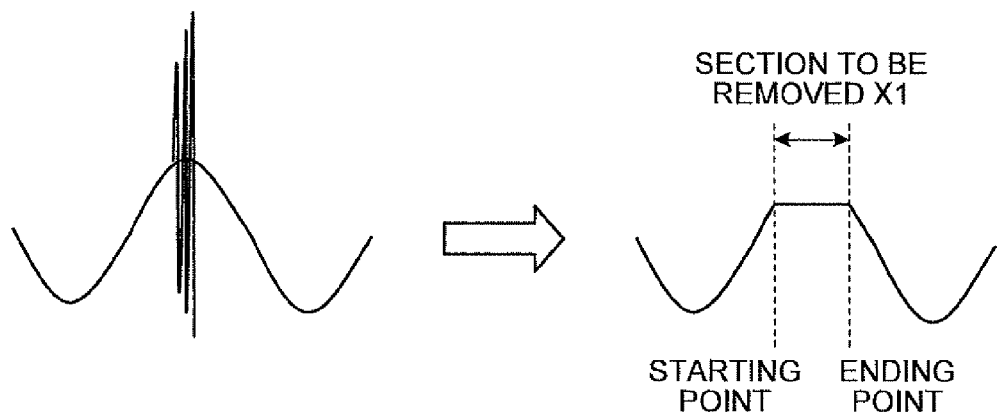
FIGS. 5A and 5B are schematic diagrams for explaining processing contents in a first blanking process and a second blanking process related to a blanking processor in an IF noise processor.
Figure 5B:
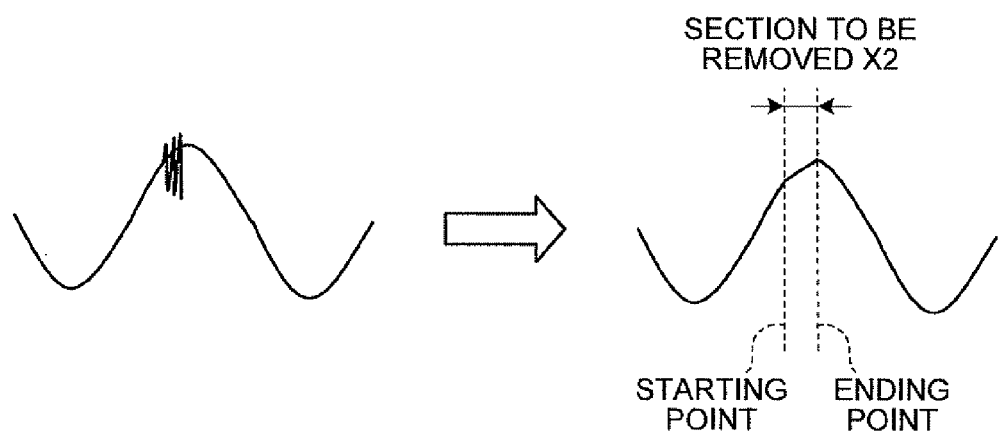

FIGS. 5A and 5B are schematic diagrams for explaining processing contents in a first blanking process and a second blanking process related to a blanking processor 14A in the IF noise processor 14. Upon detection of the control signal indicating the determination that the broadcast signal includes large noise, the blanking processor 14A in the IF noise processor 14 performs the first blanking process, as shown in FIG. 5A. In the first blanking process, a section to be removed that includes noise components among continuous signal sections of the IF signal is removed and signal interpolation is performed on the removed section. For the signal interpolation, linear interpolation for linearly performing signal interpolation between a starting point and an ending point of the section to be removed is adopted. A section to be removed X1 in the first blanking process is set longer than a section to be removed X2 in the second blanking process, in order to focus on removal of noise components.

Upon detection of the control signal indicating the determination that the broadcast signal includes medium noise, the blanking processor 14A performs the second blanking process, as shown in FIG. 5B. In the second blanking process, a section to be removed that includes noise components among continuous signal sections of the IF signal is removed and signal interpolation is performed linearly on the removed section. The section to be removed X2 in the second blanking process is set shorter than the section to be removed X1 in the first blanking process, in order to focus on suppression of audio distortion generated due to removal of noise components. Upon detection of the control signal indicating the determination that the broadcast signal does not include noise, the blanking processor 14A prohibits performing of the blanking process.

Upon detection of the control signal indicating the determination that the broadcast signal includes large noise, a blanking processor 17A in the audio noise processor 17 performs a third blanking process. In the third blanking process, a section to be removed that includes noise components among continuous signal sections of the audio signal is removed and signal interpolation is performed linearly on the removed section. The section to be removed in the third blanking process is set longer than a section to be removed in a fourth blanking process described later, in order to focus on removal of noise components.

Upon detection of the control signal indicating the determination that the broadcast signal includes medium noise, the blanking processor 17A performs the fourth blanking process. In the fourth blanking process, a section to be removed that includes noise components among continuous signal sections of the audio signal is removed and signal interpolation is performed linearly on the removed section. The section to be removed in the fourth blanking process is set shorter than the section to be removed in the third blanking process, in order to focus on suppression of audio distortion generated due to removal of noise components. Upon detection of the control signal indicating the determination that the broadcast signal does not include noise, the blanking processor 17A prohibits performing of the blanking process.

FIG. 6 is a table for explaining contents of noise determination and of a blanking process corresponding to the noise status of the AM detection signal and the FM detection signal. As shown in FIG. 6, upon simultaneous detection of high-level signals from both the AM noise detector 32 and the FM noise detector 34, the noise determining unit 35 determines that both the AM detection signal and the FM detection signal include noise components, and that the broadcast signal includes large noise. The blanking processor 14A performs the first blanking process on the IF signal and the blanking processor 17A performs the third blanking process on the audio signal.

As shown in FIG. 6, upon simultaneous detection of a high-level signal from the AM noise detector 32 and a low-level signal from the FM noise detector 34, the noise determining unit 35 determines that an AM detection signal includes AM noise components, and that the broadcast signal includes medium noise. The blanking processor 14A performs the second blanking process on the IF signal, and the blanking processor 17A performs the fourth blanking process on the audio signal.

As shown in FIG. 6, upon simultaneous detection of a low-level signal from the AM noise detector 32 and a high-level signal from the FM noise detector 34, the noise determining unit 35 determines that an FM detection signal includes FM noise components, and that the broadcast signal includes medium noise. The blanking processor 14A performs the second blanking process on the IF signal, and the blanking processor 17A performs the fourth blanking process on the audio signal.

As shown in FIG. 6, upon simultaneous detection of low-level signals from both the AM noise detector 32 and the FM noise detector 34, the noise determining unit 35 determines that both the AM detection signal and the FM detection signal do not include noise components, and that the broadcast signal does not include noise. The blanking processor 14A prohibits the blanking process on the IF signal and the blanking processor 17A prohibits the blanking process on the audio signal.

An operation of the broadcast receiving apparatus 1 according to the first embodiment is explained next. A reception environment changes with a movement of a vehicle having the broadcast receiving apparatus incorporated therein, and there is a case that the broadcast receiving apparatus 1 receives a broadcast signal contaminated by noise components.

Upon reception of airwaves through the receiving antenna 11, the front end unit 12 converts the received airwaves to an IF signal. The A/D converter 13 digitally converts the IF signal to a digital signal. The IF noise processor 14 performs a blanking process on the digitally converted IF signal based on a detection result acquired by the noise detector 21.

The digitally converted IF signal from the A/D converter 13 is respectively input to the AM detector 31 and the FM detector 33 in the noise detector 21. The AM detector 31 performs AM detection on the IF signal to acquire an AM detection signal. The AM noise detector 32 determines whether the AM detection level of the AM detection signal is equal to or higher than the AM noise threshold Vtha, and detects a signal portion equal to or higher than the AM noise threshold Vtha of the AM detection level as an AM noise component. Upon detection of the AM noise component, the AM noise detector 32 outputs a high-level signal to the noise determining unit 35.

Further, the FM detector 33 performs FM detection on the IF signal to acquire an FM detection signal. The FM noise detector 34 determines whether the FM detection level of the FM detection signal is equal to or higher than the FM noise threshold Vthf, and detects a signal portion equal to or higher than the FM noise threshold Vthf of the FM detection level as an FM noise component. Upon detection of the FM noise component, the FM noise detector 34 outputs a high-level signal to the noise determining unit 35.

Upon simultaneous detection of high-level signals from both the AM noise detector 32 and the FM noise detector 34, the noise determining unit 35 determines that the broadcast signal includes large noise. The noise determining unit 35 then outputs a control signal indicating a determination that the broadcast signal includes large noise to the blanking processor 14A in the IF noise processor 14 and the blanking processor 17A in the audio noise processor 17. Upon detection of the control signal indicating the determination that the broadcast signal includes large noise, the blanking processor 14A performs the first blanking process on the IF signal digitally converted by the A/D converter 13. By performing the first blanking process focusing on removal of noise components on the IF signal, the blanking processor 14A removes the section to be removed of the IF signal that includes noise components, and performs linear signal interpolation on the removed section. As a result, noise components in the IF signal can be reduced considerably.

Further, upon detection of a high-level signal from one of the AM noise detector 32 and the FM noise detector 34, the noise determining unit 35 determines that the broadcast signal includes medium noise. The noise determining unit 35 then outputs a control signal indicating a determination that the broadcast signal includes medium noise to the blanking processor 14A and the blanking processor 17A. Upon detection of the control signal indicating the determination that the broadcast signal includes medium noise, the blanking processor 14A performs the second blanking process on the IF signal digitally converted by the A/D converter 13. The blanking processor 14A removes the section to be removed that includes noise components in order to preferentially suppress audio distortion due to removal of noise components in the IF signal by performing the second blanking process focusing on suppression of audio distortion on the IF signal, and performs linear signal interpolation on the removed section. As a result, the second blanking process can suppress audio distortion due to removal of noise more than the first blanking process, although the noise components that can be removed become less.

Upon simultaneous detection of low-level signals from both the AM noise detector 32 and the FM noise detector 34, the noise determining unit 35 determines that the broadcast signal does not include noise. The noise determining unit 35 then outputs a control signal indicating a determination that the broadcast signal does not include noise to the blanking processor 14A in the IF noise processor 14 and the blanking processor 17A in the audio noise processor 17. Upon detection of the control signal indicating the determination that the broadcast signal does not include noise, the blanking processor 14A prohibits performing of the blanking process.

The IF processor 15 further performs a digital filtering process on the IF signal, which is an output signal from the IF noise processor 14. The audio frequency converter 16 converts the IF signal having been subjected to digital filtering process to an audio signal. Upon detection of the control signal indicating the determination that the broadcast signal includes large noise, the blanking processor 17A in the audio noise processor 17 performs the third blanking process on the audio signal converted by the audio frequency converter 16. The blanking processor 17A removes a section to be removed of the audio signal that includes noise components by performing the third blanking process focusing on removal of noise components on the audio signal, and performs linear signal interpolation on the removed section. As a result, noise components in the audio signal can be reduced considerably.

Upon detection of the control signal indicating the determination that the broadcast signal includes medium noise, the blanking processor 17A performs the fourth blanking process on the audio signal converted by the audio frequency converter 16. The blanking processor 17A removes the section to be removed that includes noise components in order to preferentially suppress audio distortion due to removal of noise components in the audio signal by performing the fourth blanking process focusing on suppression of audio distortion on the audio signal, and performs linear signal interpolation on the removed section. As a result, the fourth blanking process can suppress audio distortion due to removal of noise more than the third blanking process, although the noise components that can be removed become less. Upon detection of the control signal indicating that the broadcast signal does not include noise, the blanking processor 17A prohibits performing of the blanking process.

Further, the audio processor 18 performs audio processing on the audio signal, which is an output signal from the audio noise processor 17, and acoustically outputs the audio-processed audio signal from the speaker 19.

In the first embodiment, upon detection of noise components both in the AM detection signal and the FM detection signal, it is determined that the broadcast signal includes large noise, and the first blanking process (the third blanking process) focusing on removal of noise components is performed on the IF signal (audio signal). As a result, noise components in the broadcast signal can be reduced considerably.

Further, in the first embodiment, upon detection of noise components only in one of the AM detection signal and the FM detection signal, it is determined that the broadcast signal includes medium noise, and the second blanking process (the fourth blanking process) focusing on suppression of audio distortion is performed on the IF signal (audio signal). As a result, the second (the fourth blanking process) blanking process can suppress audio distortion due to removal of noise more than the first blanking process (the third blanking process), although the noise components that can be removed become less.

Further, in the first embodiment, because the section to be removed X2 in the second blanking process is set shorter than the section to be removed X1 in the first blanking process, although noise components that can be removed become less, audio distortion due to removal of noise can be preferentially suppressed.

Further, in the first embodiment, AM noise components that cannot be determined only by the AM detection signal, for example, AM noise components lower than the AM noise threshold Vtha, in which noise is actually mixed, can be determined by using the FM noise components in the FM detection signal as well as the AM noise components in the AM detection signal.

Further, in the first embodiment, such a situation can be prevented that although a noise component is not mixed, a modulation component equal to or higher than the AM noise threshold Vtha is erroneously detected as an AM noise component and it is erroneously determined that there is noise in the broadcast signal. As a result, in the first embodiment, the presence of noise in the broadcast signal corresponding to the reception environment can be determined highly accurately.

In the first embodiment, the noise determining unit 35 determines the presence of noise in the broadcast signal based on the noise detection results by the AM noise detector 32 and the FM noise detector 34. However, as explained below, a noise determining unit can be formed of a logic circuit such as an AND unit and an OR unit.

Figure 7:
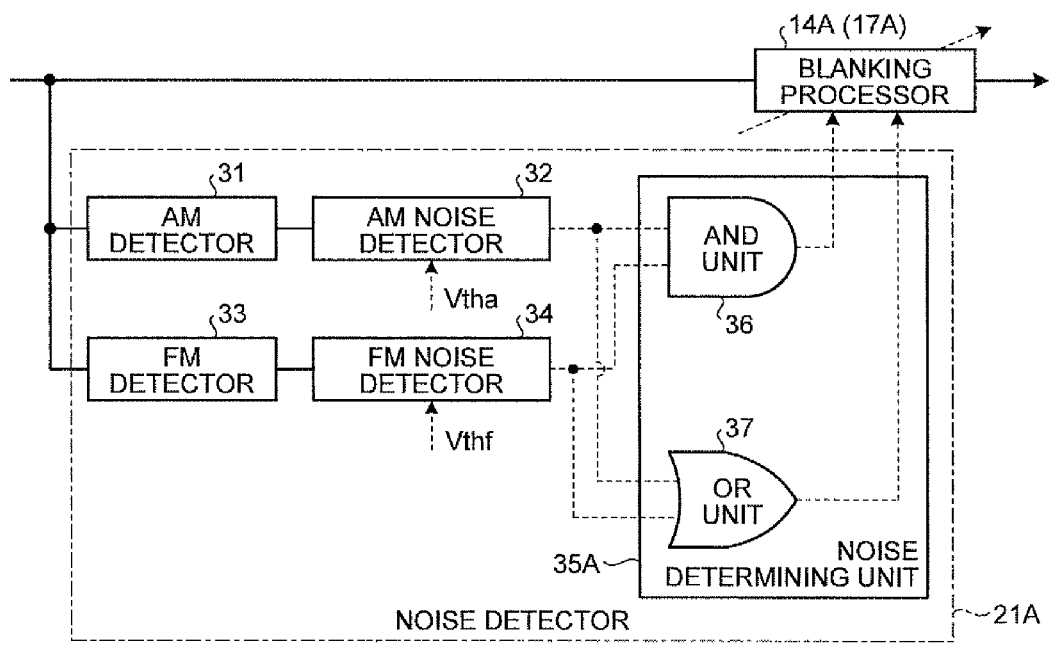
FIG. 7 is a block diagram of an internal configuration of a noise detector according to a second embodiment of the present invention.

Therefore, an embodiment of a broadcast receiving apparatus that includes a noise determining unit including an AND unit and an OR unit is explained as a second embodiment of the present invention. FIG. 7 is a block diagram of an internal configuration of a noise detector according to the second embodiment. Constituent elements identical to those of the broadcast receiving apparatus 1 according to the first embodiment are denoted by like reference numerals and redundant explanations of the configurations and operations thereof will be omitted.

The broadcast receiving apparatus according to the second embodiment differs from that according to the first embodiment in that, as shown in FIG. 7, a noise determining unit 35A including an AND unit 36 and an OR unit 37 is provided instead of the noise determining unit 35.

A noise detector 21A shown in FIG. 7 includes the noise determining unit 35A in addition to the AM detector 31, the AM noise detector 32, the FM detector 33, and the FM noise detector 34. The AND unit 36 outputs a high-level signal indicating a determination that the broadcast signal includes large noise to the blanking processors 14A and 17A, only when high-level signals from the AM noise detector 32 and the FM noise detector 34 are simultaneously detected.

The OR unit 37 outputs a high-level signal indicating a determination that the broadcast signal includes medium noise to the blanking processors 14A and 17A, only when a high-level signal from one of the AM noise detector 32 and the FM noise detector 34 is detected.

Upon detection of the high-level signal indicating the determination that the broadcast signal includes large noise from the AND unit 36, the blanking processor 14A performs the first blanking process on the IF signal digitally converted by the A/D converter 13.

Upon detection of the high-level signal indicating the determination that the broadcast signal includes medium noise from the OR unit 37, the blanking processor 14A performs the second blanking process on the IF signal digitally converted by the A/D converter 13.

Further, upon detection of the high-level signal indicating the determination that the broadcast signal includes large noise from the AND unit 36, the blanking processor 17A performs the third blanking process on the audio signal frequency-converted by the audio frequency converter 16.

Upon detection of the high-level signal indicating the determination that the broadcast signal includes medium noise from the OR unit 37, the blanking processor 17A performs the fourth blanking process on the audio signal frequency-converted by the audio frequency converter 16.

An operation of the broadcast receiving apparatus according to the second embodiment is explained next. Upon detection of the airwaves through the receiving antenna 11, the front end unit 12 converts the received airwaves to an IF signal. The A/D converter 13 then converts the IF signal to a digital signal. The IF noise processor 14 performs a blanking process on the digitally converted IF signal, based on a detection result acquired by the noise detector 21A.

The IF signal digitally converted by the A/D converter 13 is input to the AM detector 31 and the FM detector 33 in the noise detector 21A. The AM detector 31 performs AM detection on the IF signal to acquire an AM detection signal. The AM noise detector 32 determines whether the AM detection level of the AM detection signal is equal to or higher than the AM noise threshold Vtha, and detects a signal portion equal to or higher than the AM noise threshold Vtha of the AM detection level as AM noise components. Upon detection of the AM noise components, the AM noise detector 32 outputs a high-level signal to the AND unit 36 and the OR unit 37.

Further, the FM detector 33 acquires an FM detection signal by performing FM detection on the IF signal. The FM noise detector 34 determines whether the FM detection level of the FM detection signal is equal to or higher than the FM noise threshold Vthf, and detects a signal portion equal to or higher than the FM noise threshold Vthf of the FM detection level as noise components in the FM detection signal. Upon detection of the FM noise components, the FM noise detector 34 outputs a high-level signal to the AND unit 36 and the OR unit 37.

Upon simultaneous detection of high-level signals from both the AM noise detector 32 and the FM noise detector 34, the AND unit 36 outputs a high-level signal to the blanking processor 14A in the IF noise processor 14 and the blanking processor 17A in the audio noise processor 17. Upon detection of the high-level signal from the AND unit 36, the blanking processor 14A performs the first blanking process on the IF signal digitally converted by the A/D converter 13. By performing the first blanking process focusing on removal of noise components on the IF signal, the blanking processor 14A removes a section to be removed of the IF signal that includes the noise component, and performs linear signal interpolation on the removed section. As a result, noise components in the IF signal can be reduced considerably.

Further, upon detection of a high-level signal from one of the AM noise detector 32 and the FM noise detector 34, the OR unit 37 outputs a high-level signal to the blanking processor 14A and the blanking processor 17A. Upon detection of the high-level signal from the OR unit 37, the blanking processor 14A performs the second blanking process on the IF signal digitally converted by the A/D converter 13. By performing the second blanking process focusing on suppression of audio distortion on the IF signal, the blanking processor 14A removes a section to be removed that includes noise components in order to preferentially suppress audio distortion due to removal of noise components in the IF signal by performing the second blanking process focusing on suppression of audio distortion on the IF signal, and performs linear signal interpolation on the removed section. As a result, the second blanking process can suppress audio distortion due to removal of noise more than the first blanking process, although the noise components that can be removed become less.

Further, upon detection of low-level signals from both of the AND unit 36 and the OR unit 37, the blanking processor 14A prohibits performing of the blanking process.

Furthermore, the IF processor 15 performs a digital filtering process on the IF signal, which is an output signal from the IF noise processor 14. The audio frequency converter 16 converts the IF signal having undergone a digital filtering process to an audio signal. Upon detection of a high-level signal from the AND unit 36, the blanking processor 17A of the audio noise processor 17 performs the third blanking process on the audio signal converted by the audio frequency converter 16. The blanking processor 17A removes a section to be removed of the audio signal that includes noise components by performing the third blanking process focusing on removal of noise components on the audio signal, and performs linear signal interpolation on the removed section. As a result, noise components in the audio signal can be reduced considerably.

Upon detection of a high-level signal from the OR unit 37, the blanking processor 17A performs the fourth blanking process on the audio signal converted by the audio frequency converter 16. The blanking processor 17A removes a section to be removed of the audio signal that includes noise components in order to preferentially suppress audio distortion due to removal of noise components in the audio signal by performing the fourth blanking process focusing on suppression of audio distortion on the audio signal, and performs linear signal interpolation on the removed section. As a result, the fourth blanking process can suppress audio distortion due to removal of noise more than the third blanking process, although the noise components that can be removed become less. Upon detection of low-level signals from both the AND unit 36 and the OR unit 37, the blanking processor 17A prohibits performing of the blanking process.

Further, the audio processor 18 performs audio processing on the audio signal, which is an output signal from the audio noise processor 17, and acoustically outputs the audio-processed audio signal from the speaker 19.

In the second embodiment, when a high-level signal from the AND unit 36 is detected according to detection of noise components in the AM detection signal and the FM detection signal, the first blanking process (the third blanking process)

focusing on removal of noise components is performed on the IF signal (audio signal). As a result, noise components in the broadcast signal can be reduced considerably.

Further, in the second embodiment, when a high-level signal from the OR unit 37 is detected according to detection of noise components only in one of the AM detection signal and the FM detection signal, the second blanking process (the fourth blanking process) focusing on suppression of audio distortion is performed on the IF signal (audio signal). As a result, the second blanking process (the fourth blanking process) can suppress audio distortion due to removal of noise more than the first blanking process (the third blanking process), although the noise components that can be removed become less.

Further, in the second embodiment, because the internal configuration of the noise determining unit 35A is formed of the AND unit 36 and the OR unit 37, the circuit configuration thereof can be simplified.

In the first and second embodiments, a blanking process is performed by using the blanking processor 14A in the IF noise processor 14 and the blanking processor 17A in the audio noise processor 17. However, a blanking process can be performed by using only one blanking processor 14A (17A) in the IF noise processor 14 or the audio noise processor 17, and in this case, only one blanking processor is required. Further, in the first and second embodiments, linear interpolation for linearly performing signal interpolation between the starting point and the ending point of the section to be removed is explained as an example of the blanking process. However, pre-interpolation can be adopted to interpolate the starting point and the ending point of the section to be removed by using a signal immediately before the noise component.

Similarly, linear prediction interpolation can be adopted in such a manner that histories of sequentially detected IF signals are retained, a signal portion approximating a signal portion at the normal time of the section to be removed is read from the retained histories of the IF signals, and the starting point and the ending point of the section to be removed are interpolated by using the read signal portion.

In a broadcasting station that transmits airwaves, airwaves may be over-modulated and transmitted in order to expand its service area. Here, "over-modulation" refers to a state where a modulation factor of airwaves exceeds a specified value (specifically, 100%).

The broadcast receiving apparatus 1 according to the first and second embodiments has such a problem that when over-modulated airwaves are input, FM noise can be erroneously detected by the FM noise detector 34, although actually there is no noise component.

Figure 8A:
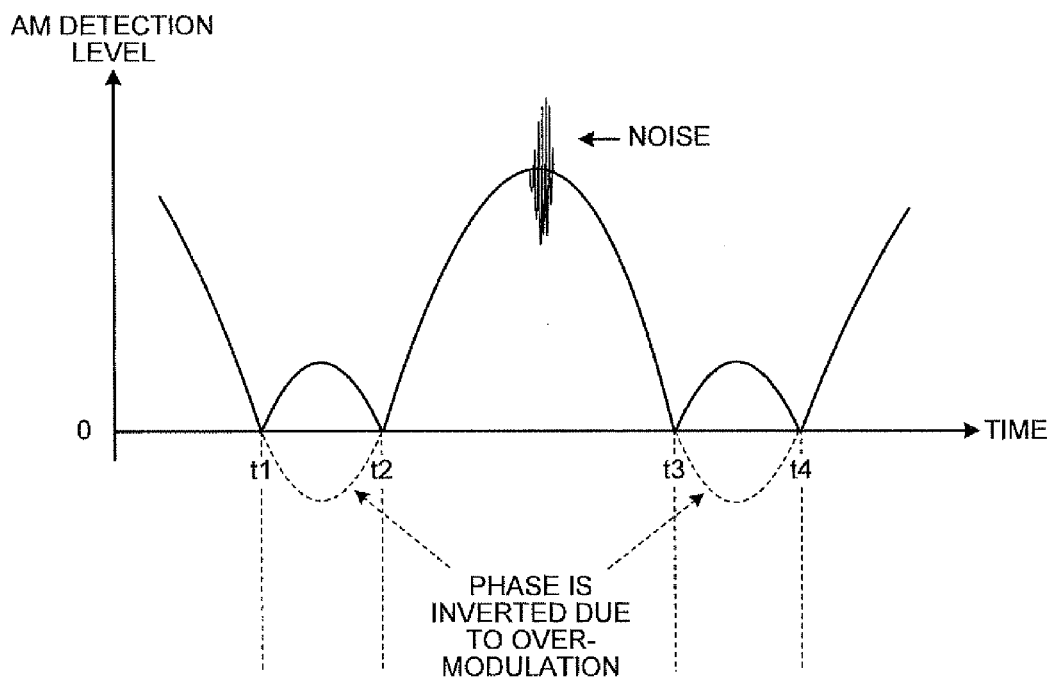
FIGS. 8A and 8B are schematic diagrams for explaining a problem in the reception of over-modulated airwaves.
Figure 8B:
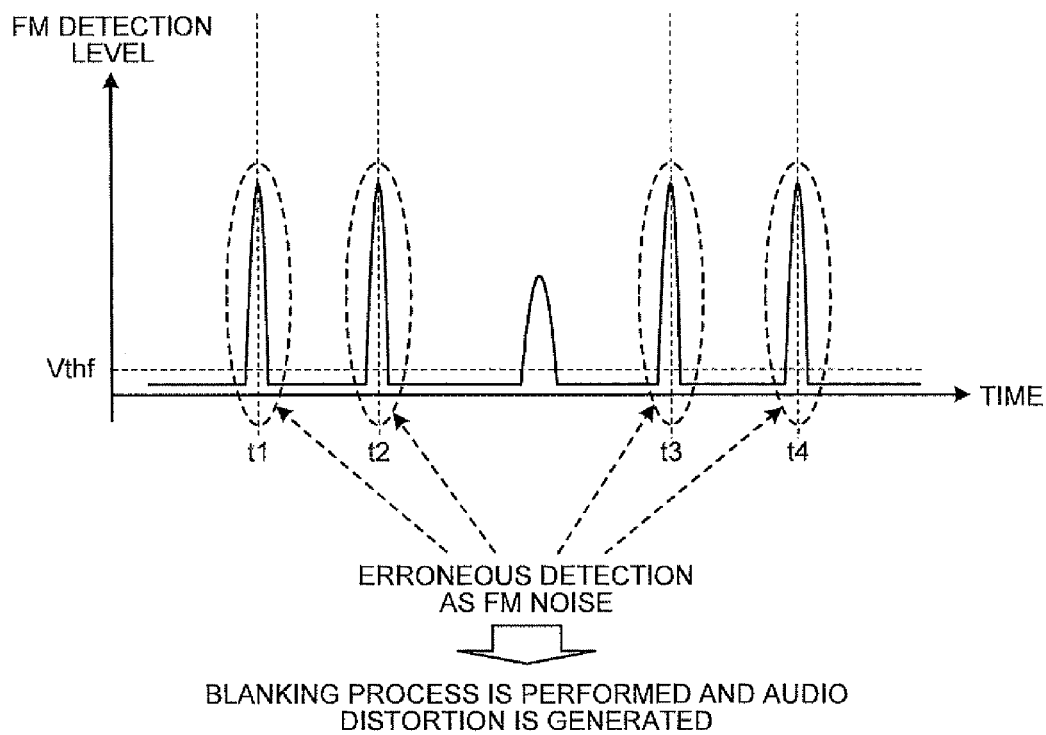

This problem is specifically explained with reference to FIGS. 8A and 8B. FIGS. 8A and 8B are schematic diagrams for explaining a problem when over-modulated airwaves are received. FIG. 8A is an example of an AM detection signal including over-modulated airwaves, and FIG. 8B depicts an FM detection signal corresponding to the AM detection signal shown in FIG. 8A.

As shown in FIG. 8A, in a section where over-modulated airwaves are received, the phase of an AM detection signal is inverted. For example, in FIG. 8A, over-modulated airwaves are input in a period between a time t1 and a time t2 and a period between a time t3 and a time t4. In this case, the phase of the AM detection signal is inverted about an AM detection level "0" in the period between the time t1 and the time t2 and the period between the time t3 and t4.

When phase inversion occurs in the AM detection signal, the AM detection level changes abruptly. As a result, as shown in FIG. 8B, a peak appears about the timing at which the phase is inverted (here, the times t1 to t4) in the FM detection signal. When these peaks are equal to or higher than the FM noise threshold Vthf, the FM noise detector 34 erroneously detects these peaks as FM noise.

As a result, the blanking processors 14A and 17A perform the blanking process, although actually there is no noise component, thereby causing audio distortion. Therefore, in a third embodiment of the present invention, occurrence of audio distortion is suppressed by preventing performing erroneous operations of the FM noise detector 34 due to over-modulation.

Figure 9:
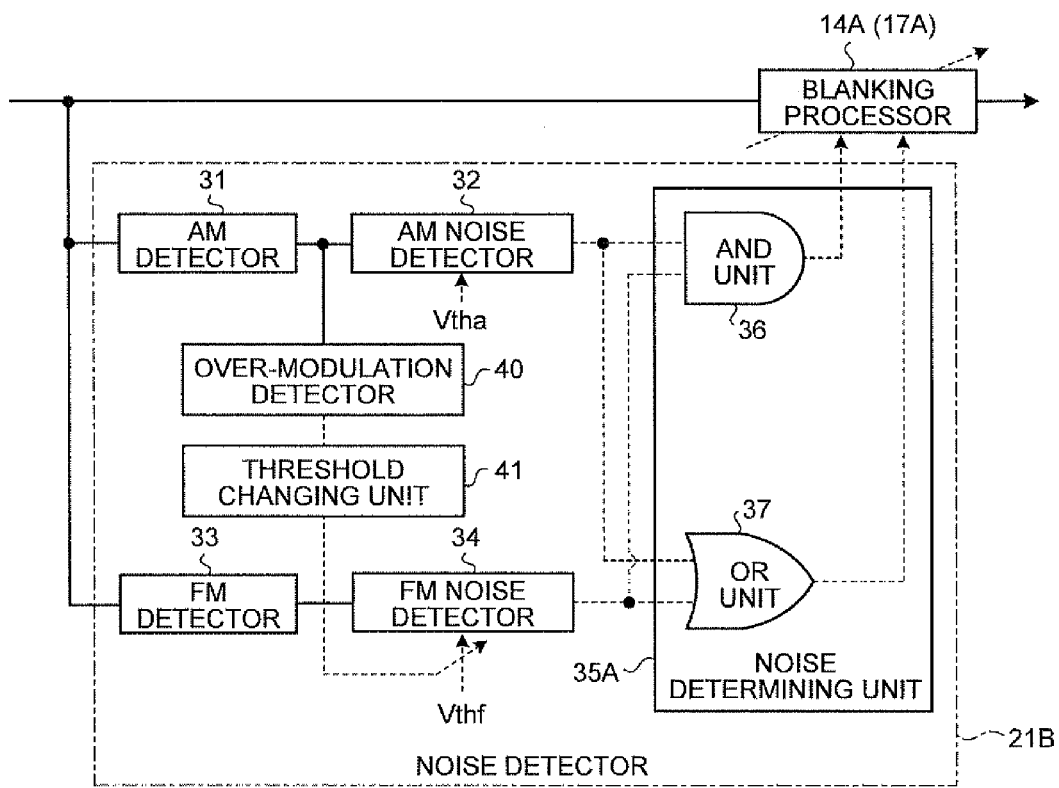
FIG. 9 is a block diagram of an internal configuration of a noise detector according to a third embodiment of the present invention.

FIG. 9 is a block diagram of an internal configuration of a noise detector 21B according to the third embodiment. Constituent elements identical to those of the noise detector 21A according to the second embodiment are denoted by like reference numerals and redundant explanations of the configurations and operations thereof will be omitted.

As shown in FIG. 9, the noise detector 21B according to the third embodiment further includes an over-modulation detector 40 and a threshold changing unit 41. The over-modulation detector 40 receives an AM detection signal from the AM detector 31, and detects the presence of over-modulation based on the AM detection level of the received AM detection signal.

Specifically, the over-modulation detector 40 detects the presence of over-modulation by detecting an inversion timing of the AM detection signal, that is, the timing at which the AM detection level becomes "0". Upon detection of the timing at which the AM detection level becomes "0", the over-modulation detector 40 outputs such a detection result to the threshold changing unit 41.

In the following explanations, the timing at which the AM detection level becomes "0" is referred to as "zero point". In the case shown in FIG. 8A, the time t1 to the time t4 respectively correspond to the zero point.

The threshold changing unit 41 changes an FM noise threshold based on a detection result acquired by the over-modulation detector 40. Specifically, when a detection result of the zero point is input from the over-modulation detector 40, the threshold changing unit 41 changes the FM noise threshold applied to the FM detection signal detected in a predetermined period including the zero point to a value higher than normal. The FM noise threshold after the change needs only to be a value sufficiently higher than the peak of the FM detection signal appearing due to the phase inversion of the AM detection signal.

An operation example of the over-modulation detector 40 and the threshold changing unit 41 is explained next with reference to FIGS. 10A to 10C. FIGS. 10A to 10C are operation examples of the over-modulation detector 40 and the threshold changing unit 41. The AM detection signal shown in FIG. 10A is the same as the AM detection signal shown in FIG. 8A. As shown in FIG. 10A, the over-modulation detector 40 detects the time t1 to the time t4, which are the zero points in the AM detection signal, and outputs a detection result to the threshold changing unit 41.

As shown in FIG. 10B, the threshold changing unit 41 changes the FM noise threshold in a predetermined period about the zero point to a value higher than normal. For example, in the case shown in FIG. 10B, the threshold changing unit 41 changes the FM noise threshold to be applied in the period of from a time t1$a$ to a time t1$b$ about the zero point t1 to a value Vthf', which is higher than the normal threshold Vthf.

Accordingly, the FM noise threshold Vthf' becomes higher than a peak resulting from the phase inversion of the AM detection signal, and the FM noise detector 34 does not detect such a peak as FM noise. Therefore, as shown in FIG. 10C, a high-level signal, which is a trigger for performing a blanking process, is not output in the respective predetermined periods about the zero points t1 to t4.

In this manner, by changing the FM noise threshold in the predetermined period including the timing, at which the phase of the AM detection signal is inverted, to a value higher than normal, it can be prevented that a peak in the FM detection signal resulting from the phase inversion of the AM detection signal is erroneously detected as FM noise. As a result, a blanking process is not performed in a section where there is actually no noise component, and thus occurrence of audio distortion can be suppressed.

If FM noise detection is to be performed in real time on the FM detection signal output from the FM detector 33, erroneous detection of FM noise may not be appropriately prevented. This is because the peak about the zero point starts to appear from a timing before the zero point. Therefore, even if the FM noise threshold is changed after detection of the zero point, FM noise can be erroneously detected due to a signal portion before the zero point.

To appropriately remove the peak about the zero point, therefore, the FM noise detector 34 holds the FM detection signal output from the FM detector 33 for a certain period of time to perform FM noise detection eventually. Even in this case, needless to say, the AM noise detector 32 and the FM noise detector 34 simultaneously output the noise detection results of the AM detection level and the FM detection level at the same timing.

An example in which the threshold changing unit 41 changes the FM noise threshold based on the detection result of over-modulation acquired by the over-modulation detector 40 to prevent erroneous detection of FM noise by the FM noise detector 34 has been explained above. However, the method of preventing erroneous detection of FM noise is not limited thereto.

For example, erroneous detection of FM noise can be prevented by performing correction of removing a peak, which is a cause of erroneous detection of FM noise, from the FM detection signal detected by the FM detector 33. This point is explained below with reference to FIGS. 11 and 12.

Figure 11:
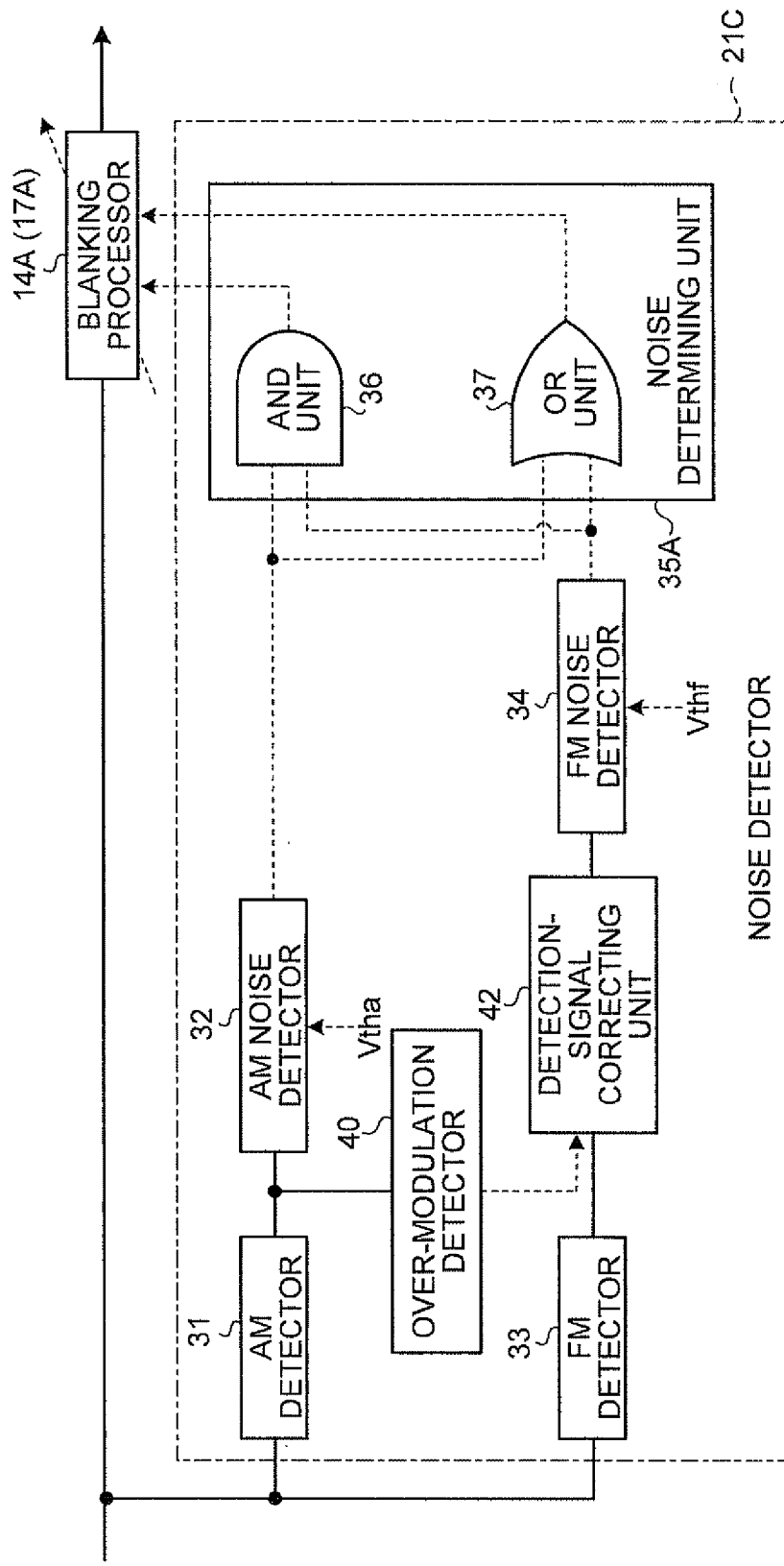
FIG. 11 is a block diagram of another internal configuration of the noise detector according to the third embodiment.

FIG. 11 is a block diagram of another internal configuration of the noise detector according to the third embodiment. Constituent elements identical to those of the noise detector 21B shown in FIG. 9 are denoted by like reference numerals and redundant explanations of the configurations and operations thereof will be omitted.

As shown in FIG. 11, a noise detector 21C includes a detection-signal correcting unit 42 instead of the threshold changing unit 41. The detection-signal correcting unit 42 corrects the FM detection level of the FM detection signal detected by the FM detector 33, based on a detection result of over-modulation acquired by the over-modulation detector 40.

Specifically, when a detection result of a zero point is input from the over-modulation detector 40, the detection-signal correcting unit 42 multiplies the FM detection level of the FM detection signal detected in a predetermined period including a zero point by "0", to correct the FM detection level of the FM detection signal to "0". According to such correction, a peak about the zero point, which causes erroneous detection of FM noise, is removed.

If an FM detection signal output from the FM detector 33 is corrected in real time, erroneous detection of FM noise may not be prevented appropriately. This is because a peak about a zero point, which causes erroneous detection of FM noise, starts to appear at a timing before the zero point.

Therefore, to remove the peak about the zero point appropriately, the detection-signal correcting unit 42 holds the FM detection signal output from the FM detector 33 for a certain period of time to perform FM noise detection eventually. Even in this case, needless to say, the AM noise detector 32 and the FM noise detector 34 simultaneously output the noise detection results of the AM detection level and the FM detection level at the same timing.

The detection-signal correcting unit 42 also outputs the detection signal after correction to the FM noise detector 34.

Figure 12A:
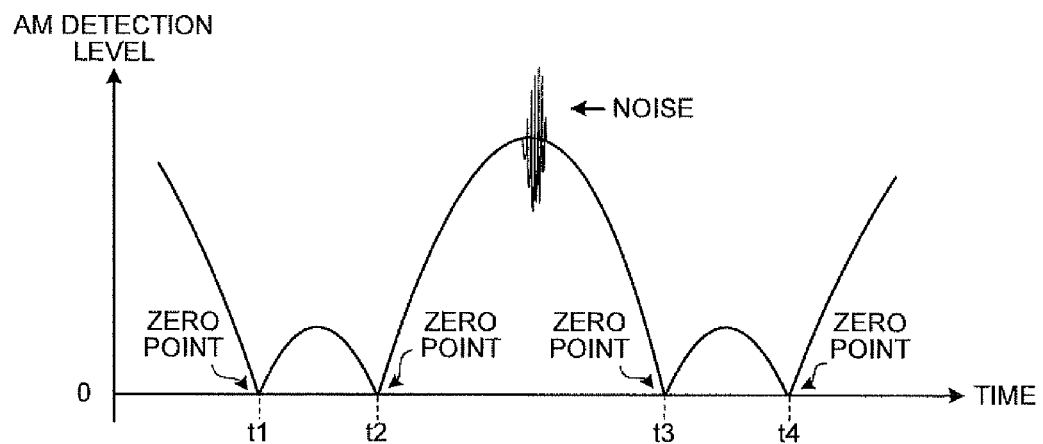
FIGS. 12A to 12C are operation examples of an over-modulation detector and a detection-signal correcting unit.
Figure 12B:
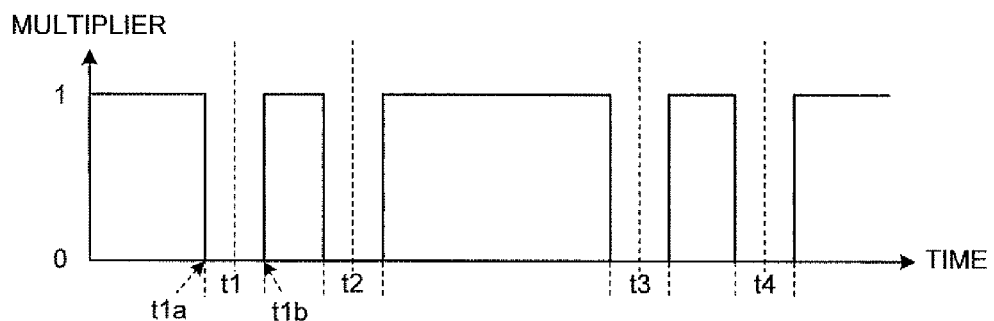
Figure 12C:
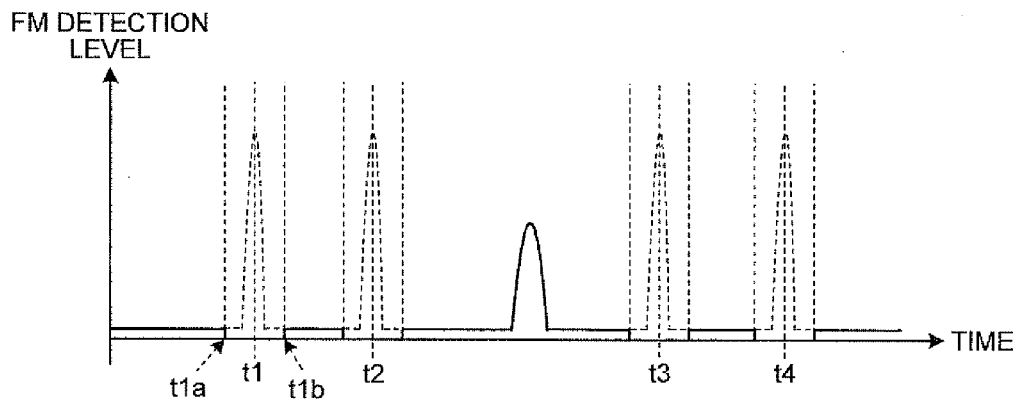
Figure 14:
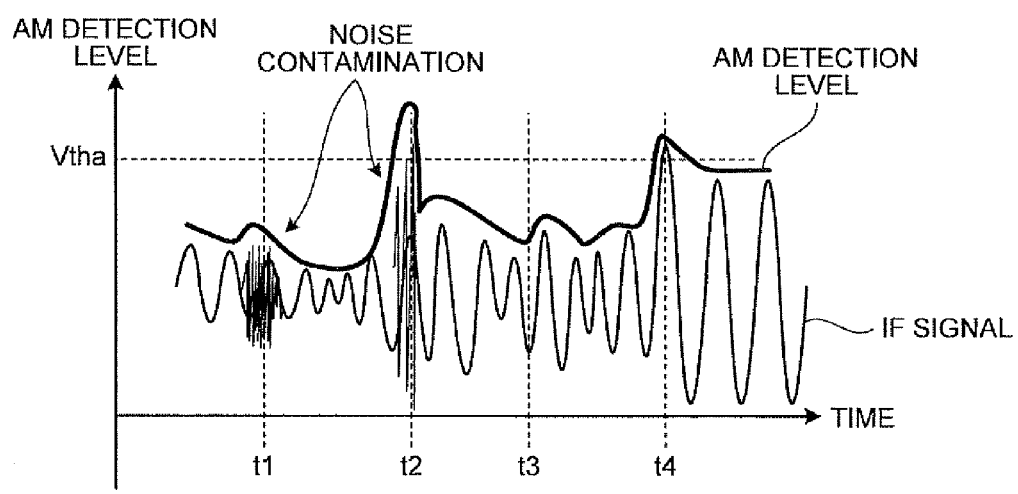
FIG. 14 is a schematic diagram for explaining the presence of noise components in an AM detection level with respect to an IF signal.

An operation example of the over-modulation detector 40 and the detection-signal correcting unit 42 is explained with reference to FIGS. 12A to 12C. FIGS. 12A to 12C are operation examples of the over-modulation detector 40 and the detection-signal correcting unit 42. The AM detection signal shown in FIG. 12A is the same as the AM detection signal shown in FIG. 8A. As shown in FIG. 12A, the over-modulation detector 40 detects the time t1 to the time t4, which are zero points in the AM detection signal, and outputs a detection result to the detection-signal correcting unit 42.

As shown in FIG. 12B, the detection-signal correcting unit 42 multiplies the FM detection level of the FM detection signal detected in a predetermined period about the zero point by "0". For example, when zero point t1 is detected, the detection-signal correcting unit 42 multiplies the FM detection level of the FM detection signal detected in a period of from the time t1a to the time t1b about the zero point t1 by "0".

Accordingly, as shown in FIG. 12C, the FM detection level of the FM detection signal detected in the predetermined period about the zero point becomes "0", thereby enabling to remove a peak about the zero point, which causes erroneous detection of FM noise.

In this manner, erroneous detection of FM noise can be prevented by removing a peak about the zero point from the FM detection signal detected in a predetermined period including the timing at which the phase of the AM detection signal is inverted. As a result, a blanking process is not performed in a section in which there is actually no noise component, and thus occurrence of audio distortion can be suppressed.

An example in which a peak about a zero point is removed by multiplying the FM detection signal by a predetermined multiplier is explained here. However, the present invention is not limited thereto, and the detection-signal correcting unit 42 can replace the FM detection level of the FM detection signal detected in a period about a zero point by a preset value. The preset value can be, for example, "0" or a steady-state value of the FM detection level.

As described above, in the third embodiment, the over-modulation detector detects the timing at which the phase of the AM detection signal is inverted, and the threshold changing unit changes the FM noise threshold to be applied to the FM detection signal detected in a predetermined period including the timing detected by the over-modulation detector. Therefore, erroneous detection of FM noise can be prevented, and thus occurrence of audio distortion can be suppressed.

Further, in the third embodiment, the over-modulation detector 40 detects the timing at which the phase of the AM detection signal is inverted, and the detection-signal correcting unit corrects the FM detection level of the FM detection signal detected in a predetermined period including the timing detected by the over-modulation detector. Therefore, erroneous detection of FM noise can be prevented, and thus occurrence of audio distortion can be suppressed.

In the respective embodiments described above, the second blanking process focuses on suppression of audio distortion by setting the section to be removed X2 in the second blanking process shorter than the section to be removed X1 in the first blanking process. However, the second blanking process can be used as a blanking process focusing on suppression of audio distortion by setting a processing time required for the second blanking process shorter than that required for the first blanking process.

Further, in the respective embodiments described above, a blanking process is adopted at the time of removing noise components in an IF signal (audio signal). Needless to say, however, the same effect can be obtained even by adopting other processing methods for removing noise components.

While a radio receiver has been explained as an example in the respective embodiments, a television receiver can be also adopted in these embodiments.

In the respective embodiments, the presence of noise in the broadcast signal is determined based on the detection results acquired by the AM noise detector 32 and the FM noise detector 34. However, the presence of noise in the broadcast signal may be determined based on the AM detection signal from the AM detector 31 and the FM detection signal from the FM detector 33, without requiring the noise detection results acquired by the AM noise detector 32 and the FM noise detector 34.

In the respective embodiments, as shown in FIG. 6, when the high-level signal from the AM noise detector 32 and the low-level signal from the FM noise detector 34 are simultaneously detected, a control signal or a high-level signal indicating a determination that the broadcast signal includes medium noise is output. The case where a high-level signal from the AM noise detector 32 and a low-level signal from the FM noise detector 34 are simultaneously detected corresponds to a noise status when it is determined that the AM detection level is equal to or higher than the AM noise threshold Vtha due to an influence of a modulation component or the like, although actually there is no noise component. As a result, the blanking processor 14A performs the second blanking process focusing on suppression of audio distortion on the IF signal, although actually there is no noise component.

Therefore, as shown in FIG. 13, as another embodiment of the present invention, when a high-level signal from the AM noise detector 32 and a low-level signal from the FM noise detector 34 are simultaneously detected, a control signal or a low-level signal indicating a determination that the broadcast signal does not include noise can be output. In this case, upon detection of the control signal or the low-level signal indicating the determination that the broadcast signal does not include noise, the blanking processors 14A and 17A prohibit performing of the blanking process.

Respective constituent elements of respective units shown in the drawings do not necessarily have to be physically configured in the way as shown in these drawings. That is, the specific mode of distribution and integration of respective units is not limited to the shown ones, and all or a part of these units can be functionally or physically distributed or integrated in an arbitrary unit, according to various kinds of load and the status of use.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A broadcast receiving apparatus comprising:
a receiving unit that receives incoming airwaves;
an AM detector that performs AM detection on a broadcast signal in airwaves received by the receiving unit to acquire an AM detection signal;
an FM detector that performs FM detection on the broadcast signal to acquire an FM detection signal;
a noise detector for AM detection that detects noise components in the AM detection signal;
a noise detector for FM detection that detects noise components in the FM detection signal; and
a noise determining unit that determines a level of noise in the broadcast signal according to timing of noise components detected by the noise detector for AM detection and the noise detector for FM detection.

2. The broadcast receiving apparatus according to claim 1, further comprising:
a noise reducing unit that performs noise reduction for reducing noise components in the broadcast signal on the broadcast signal; and
a control unit that controls the noise reducing unit based on the level of noise in the broadcast signal determined by the noise determining unit.

3. The broadcast receiving apparatus according to claim 2, wherein
the noise determining unit determines that there is noise equal to or higher than a reference level in the broadcast signal according to a timing at which noise components in the AM detection signal and noise components in the FM detection signal are detected simultaneously, and determines that there is noise less than the reference level in the broadcast signal according to a timing at which only noise components in the AM detection signal or only noise components in the FM detection signal are detected.

4. The broadcast receiving apparatus according to claim 3, wherein
when the noise determining unit determines that there is noise equal to or higher than the reference level in the broadcast signal, the control unit sets an adjustment level for reducing noise components in the broadcast signal to equal to or higher than a predetermined level, and performs the noise reduction for reducing noise components in the broadcast signal based on an adjustment level set to equal to or higher than the predetermined level, and
when the noise determining unit determines that there is noise lower than the reference level in the broadcast signal, the control unit sets the adjustment level for reducing noise components in the broadcast signal to less than the predetermined level, and controls the noise reducing unit to perform the noise reduction for reducing noise components in the broadcast signal based on an adjustment level set to lower than the predetermined level.

5. The broadcast receiving apparatus according to claim 3, wherein
the noise reducing unit reduces noise components in the broadcast signal by removing a section to be removed that includes the noise components among continuous signal sections of the broadcast signal and performing interpolation for performing signal interpolation on the removed section, and when the noise determining unit determines that there is noise equal to or higher than the reference level in the broadcast signal, the control unit controls the noise reducing unit to perform the interpolation for setting the section to be removed to equal to or larger than a reference section, and when the noise determining unit determines that there is noise lower than the reference level in the broadcast signal, the control unit controls the noise reducing unit to perform the interpolation for setting the section to be removed to smaller than the reference section.

6. The broadcast receiving apparatus according to claim 3, wherein the noise reducing unit reduces noise components in the broadcast signal by removing a section to be removed that includes the noise components among continuous signal sections of the broadcast signal and performing interpolation for performing signal interpolation on the removed section, and when the noise determining unit determines that there is noise equal to or higher than the reference level in the broadcast signal, the control unit controls the noise reducing unit to perform the interpolation by setting a processing time of the interpolation to equal to or longer than a reference time, and when the noise determining unit determines that there is noise lower than the reference level in the broadcast signal, the control unit controls the noise reducing unit to perform the interpolation by setting a processing time of the interpolation to shorter than the reference time.

7. The broadcast receiving apparatus according to claim 3, further comprising:

a timing detector that detects a timing at which a phase of the AM detection signal is inverted; and a threshold changing unit that changes a predetermined threshold to be applied to an FM detection signal detected in a predetermined period including a timing detected by the timing detector, wherein the noise detector for FM detection detects noise components in the FM detection signal based on a comparison result between a signal level of the FM detection signal and the predetermined threshold.

8. The broadcast receiving apparatus according to claim 3, further comprising:

a timing detector that detects a timing at which a phase of the AM detection signal is inverted; and an FM-detection-signal correcting unit that corrects a signal level of an FM detection signal detected in a predetermined period including a timing detected by the timing detector, wherein the noise detector for FM detection detects noise components in the FM detection signal based on a signal level corrected by the FM-detection-signal correcting unit.

9. The broadcast receiving apparatus according to claim 2, wherein the noise determining unit determines that there is noise equal to or higher than a reference level in the broadcast signal according to a timing at which noise components in the AM detection signal and noise components in the FM detection signal are detected simultaneously, and determines that there is noise less than the reference level in the broadcast signal according to a timing at which only noise components in the FM detection signal are detected.

10. A method of determining presence of noise performed by a broadcast receiving apparatus, the method comprising:

receiving incoming airwaves;

performing AM detection on a broadcast signal in airwaves received at the receiving to acquire an AM detection signal;

performing FM detection on the broadcast signal to acquire an FM detection signal;

first detecting noise components in the AM detection signal;

second detecting noise components in the FM detection signal; and determining a level of noise in the broadcast signal according to timing of noise components detected in the first detecting and the second detecting.

\* \* \* \* \*